(12) United States Patent
Miyashita

(10) Patent No.: US 8,942,553 B2
(45) Date of Patent: Jan. 27, 2015

(54) LENS DEVICE AND POSITION DETECTION METHOD OF MOVABLE OPTICAL ELEMENT

(71) Applicant: Fujifilm Corporation, Tokyo (JP)

(72) Inventor: Mamoru Miyashita, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/446,697

(22) Filed: Jul. 30, 2014

(65) Prior Publication Data

US 2014/0340560 A1 Nov. 20, 2014

Related U.S. Application Data

(63) Continuation of application No. PCT/JP2012/079699, filed on Nov. 15, 2012.

(30) Foreign Application Priority Data

Jan. 30, 2012 (JP) ................................ 2012-016971

(51) Int. Cl.
*G03B 17/00* (2006.01)
*H04N 5/238* (2006.01)
*G11B 5/008* (2006.01)

(52) U.S. Cl.
CPC ............ *H04N 5/238* (2013.01); *G11B 5/00813* (2013.01)
USPC ........ 396/87; 359/823; 359/825; 324/207.11; 324/207.13

(58) Field of Classification Search
CPC .................................................. G01D 5/34776
USPC .............. 396/72, 87; 359/823–825, 813, 694; 324/207.11, 207.13
See application file for complete search history.

(56) References Cited

U.S. PATENT DOCUMENTS

| 4,396,918 A * | 8/1983 | Wallis ........................... 342/388 |
| 2004/0004471 A1 | 1/2004 | Haas et al. |
| 2004/0027587 A1 | 2/2004 | Morimoto |
| 2010/0091926 A1 | 4/2010 | Kishibe et al. |

FOREIGN PATENT DOCUMENTS

| JP | 06-058766 | 3/1994 |
| JP | 2000-205808 | 7/2000 |

(Continued)

OTHER PUBLICATIONS

International Search Report—PCT/JP2012/079699—Feb. 12, 2013.

*Primary Examiner* — Christ Mahoney
(74) *Attorney, Agent, or Firm* — Young & Thompson

(57) ABSTRACT

A lens device includes a movable optical element, a rotary member; first and second magnetic recording scales fixedly disposed on an outer periphery of the rotary member to extend along a peripheral direction of the rotary member; a signal detecting unit which detects first to fourth signals; and a position detecting unit which detects a position of the movable optical element based on the detected signals, in which the position detecting unit includes: a phase difference calculating unit which calculates a phase difference between the first signal and the third signal, based on the detected first to fourth signals for one cycle; a phase average calculating unit which calculates an average of the phase differences respectively calculated for n cycles; and an absolute position detecting unit which detects an absolute position of the movable optical element based on the calculated average.

6 Claims, 7 Drawing Sheets

(56) References Cited

FOREIGN PATENT DOCUMENTS

| | | |
|---|---|---|
| JP | 2002-250639 | 9/2002 |
| JP | 2004-061459 | 2/2004 |
| JP | 2009-053067 | 3/2009 |
| JP | 2009-204941 | 9/2009 |
| WO | 2007/148461 | 12/2007 |
| WO | WO 2014/034315 * | 3/2014 ............. G01D 5/244 |
| WO | WO 2014/034316 A1 * | 3/2014 ............. G01D 5/244 |

* cited by examiner

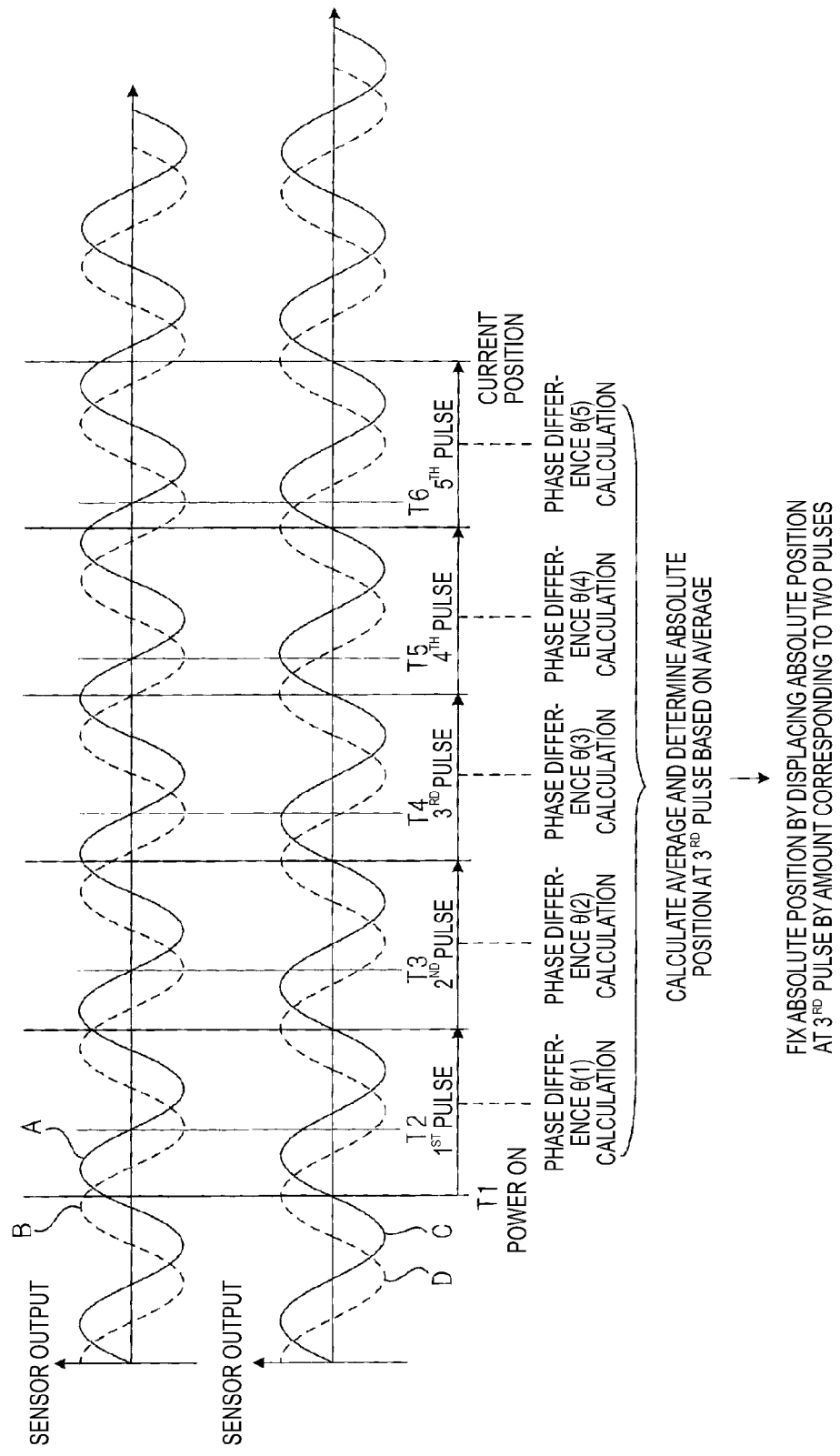

LENS DEVICE AND POSITION DETECTION METHOD OF MOVABLE OPTICAL ELEMENT

CROSS REFERENCE TO RELATED APPLICATION

This is a continuation of International Application No. PCT/JP2012/079699 filed on Nov. 15, 2012, and claims priority from Japanese Patent Application No. 2012-016971, filed on Jan. 30, 2012, the entire disclosures of which are incorporated herein by reference.

BACKGROUND

1. Technical Field

The present invention relates to a lens device which is suitable for broadcast or a movie and a position detection method of a movable optical element which is mounted in the lens device.

2. Related Art

Recently, as a large screen size and high definition of a television or a monitor has progressed, a demand on a high quality of an image to be projected is increased. In order to satisfy the demand on the high quality image, a position detector which detects a position with high precision is mounted in a zoom lens for a movie or broadcast to increase the performance of lens control.

While not for a lens device, a position detector is disclosed in Patent Literature 1 (JP-A-6-58766), Patent Literature 2 (JP-A-2002-250639) and Patent Literature 3 (JP-A-2004-507722).

A position detector disclosed in Patent Literature 1 includes two annular magnetic recording media which are recorded with magnetic signals having different wavelengths and two MR sensors which detect signals corresponding to the magnetic signals of the two annular magnetic recording media, respectively. Further, the position detector calculates a phase difference between sine waves which are respectively output from the MR sensors, based on sine waves and cosine waves which are respectively output from the two MR sensors, and detects an absolute position of the annular magnetic recording medium based on the phase difference.

A position detector disclosed in Patent Literature 2 includes two magnetic recording media which are recorded with magnetic signals having different wavelengths and two MR sensors which detect signals corresponding to the magnetic signals of the two magnetic recording media, respectively. Further, the position detector calculates a phase difference between sine waves which are respectively output from the MR sensors, based on sine waves and cosine waves which are respectively output from the two MR sensors, and obtains an initial absolute position of the magnetic recording medium based on the phase difference. Thereafter, the position detector compares a temporarily detected position of the magnetic recording medium which is obtained by incrementing the initial absolute position and an absolute position which is obtained based on the phase difference to calculate a true absolute position based on the comparison.

A position detector disclosed in Patent Literature 3 includes two annular magnetic recording media which are recorded with magnetic signals having different wavelengths and a plurality of MR sensors which is provided for each of the two annular magnetic recording media. The position detector calculates averages of sine waves and cosine waves which are respectively output from the plurality of MR sensors and calculates a phase difference between the sine waves which are respectively output from the annular magnetic recording media, based on the average of the sine waves and the average of the cosine waves which are calculated for each of the annular magnetic recording media.

SUMMARY OF INVENTION

It is considered that due to a lens barrel formed in an annular shape, a lens device is preferably mounted with a position detector by a combination of the annular magnetic recording medium and the MR sensor as described above. When the lens device is mounted with the position detector, it may be considered that a hollow annular magnetic recording medium is fixed to a rotary member which rotates in accordance with the movement of a zoom lens.

However, when the annular magnetic recording medium is formed in a hollow shape, unevenness may be easily generated in a recorded magnetic signal. The unevenness is specifically significant in a lens device having a large lens aperture such as a lens device for a television broadcast or movie. Further, since a gap between the lens device and other members is small in consideration of small size and light weight, an insertion error occurs when the position detector using the annular magnetic recording media is inserted in the lens device, which may also cause the unevenness of the magnetic signal.

When the above-mentioned unevenness is generated in the magnetic signal, the phase difference which is calculated from the output signals of the two MR sensors is shifted from a design value, and thus, it is difficult to precisely detect the absolute position of the lens.

Patent Literature 1 does not mention the above-mentioned problem or the solving means thereof under the assumption that the above-mentioned unevenness is not generated.

According to the position detector disclosed in Patent Literature 2, the true absolute position is detected but the operation processing is complicated.

According to the position detector disclosed in Patent Literature 3, even though precision of detecting the absolute position is increased, a plurality of MR sensors is required for each of the annular magnetic recording media, which may increase a manufacturing cost and a size of the lens device.

In view of above, an illustrative aspect of the present invention is to provide a lens device and a method of detecting a position of a movable optical element which are capable of detecting an absolute position of the movable optical element with low cost, simplified configuration, and high precision.

According to an aspect of the present invention, it is a lens device having a movable optical element, the lens device comprising: a rotary member which rotates in accordance with a movement of the movable optical element; a first magnetic recording scale and a second magnetic recording scale which are recorded with magnetic signals having different wavelengths, respectively, the first magnetic recording scale and the second magnetic recording scale being fixedly disposed on an outer periphery of the rotary member to extend along a peripheral direction of the rotary member; a signal detecting unit which detects a first signal corresponding to a magnetic signal having a first wavelength recorded in the first magnetic recording scale and a second signal, of which a phase is shifted from that of the first signal by a predetermined amount from the first magnetic recording scale, and detects a third signal which corresponds to a magnetic signal having a second wavelength which is different from the first wavelength and is recorded in the second magnetic recording scale and a fourth signal, of which a phase is shifted from that of the third signal by the predetermined amount from the second magnetic recording scale; and a position detecting unit which detects a position of the movable optical element based on the signals which are detected by the signal detecting unit, wherein the position detecting unit includes: a phase difference calculating unit which calculates a phase difference between the first signal and the third signal, based on the first signal, the second signal, the third signal, and the fourth signal for one cycle which are detected by the signal detecting unit; a phase average calculating unit which calculates an average of the phase differences respectively calculated for n (n is a natural number of 2 or larger) cycles by the phase difference calculating unit; and an absolute position detecting unit which detects an absolute position of the movable optical element based on the average which is calculated by the phase average calculating unit.

According to another aspect of the present invention, it is a position detection method of a movable optical element which is mounted in a lens device, the method comprising: a signal detecting step of detecting a first signal corresponding to a magnetic signal having a first wavelength which is recorded in a first magnetic recording scale and a second signal of which a phase is shifted from that of the first signal by a predetermined amount and a third signal corresponding to a magnetic signal having a second wavelength, which is different from the first wavelength, which is recorded in a second magnetic recording scale and a fourth signal of which a phase is shifted from that of the third signal by the predetermined amount, from the first magnetic recording scale and the second magnetic recording scale which are fixedly disposed on an outer periphery of a rotary member which rotates in accordance with a movement of the movable optical element and extend along the peripheral direction of the rotary member; a phase difference calculating step of calculating a phase difference between the first signal and the third signal, based on the first signal, the second signal, the third signal, and the fourth signal for one cycle which are detected by the signal detecting step; a phase average calculating step of calculating an average of the phase differences respectively calculated for n (n is a natural number of 2 or larger) cycles by the phase calculating step; and an absolute position detecting step of detecting an absolute position of the movable optical element based on the average which is calculated by the phase average calculating step.

With any of the configurations discussed above, it is possible to provide a lens device and a position detection method of a movable optical element which are capable of detecting an absolute position of the movable optical element with low cost, simplified configuration, and high precision.

BRIEF DESCRIPTION OF DRAWINGS

FIG. 9 is a view illustrating A, B, C, and D-phase waveforms output from the magnetic sensor unit 50 when the zoom ring 9 of the lens device 2 illustrated in FIG. 1 rotates in one direction.

DESCRIPTION OF EMBODIMENTS

Hereinafter, an exemplary embodiment of the present invention will be described with reference to the drawings.

Figure 1:
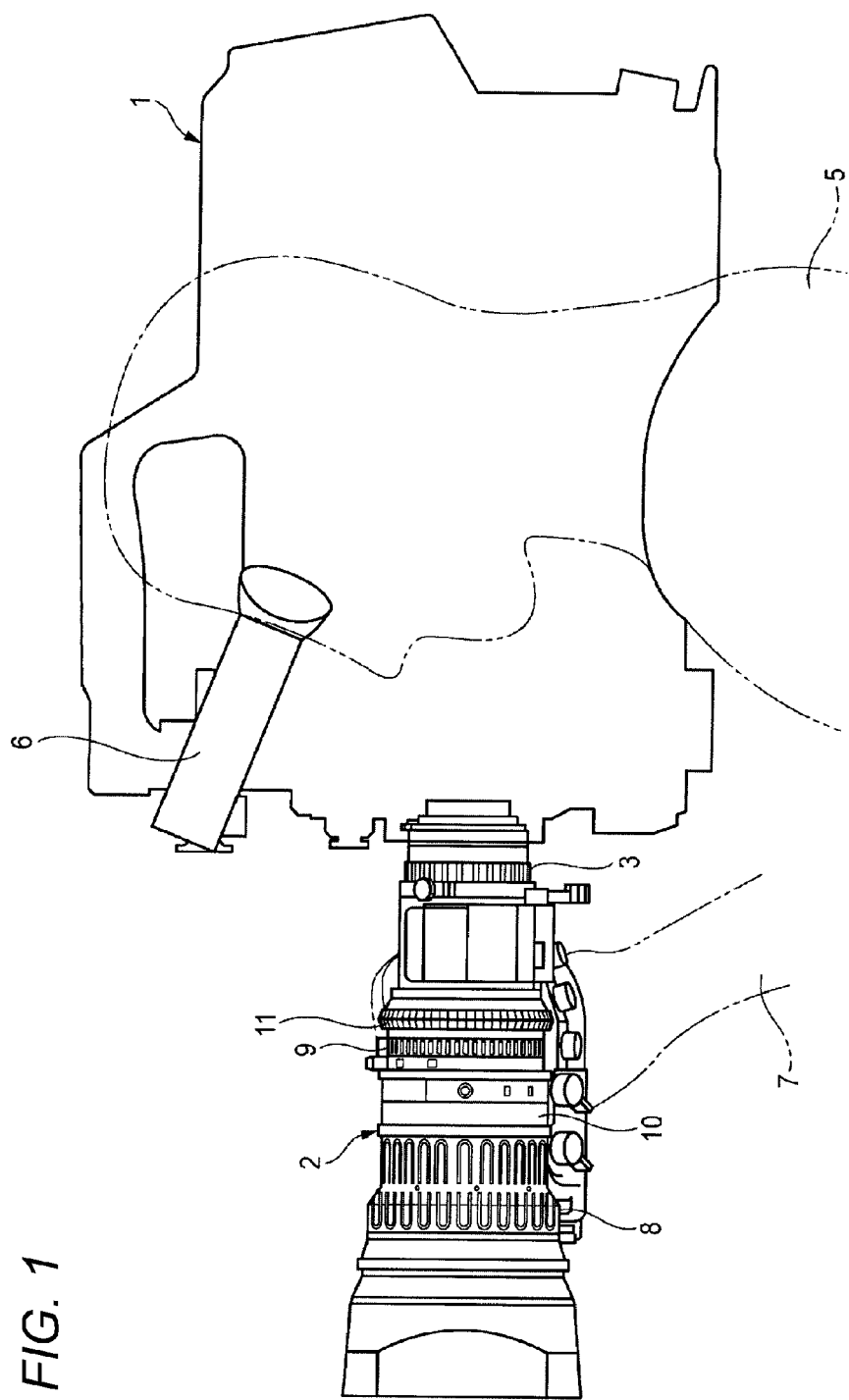
FIG. 1 is an external view of an imaging device which is mounted with a lens device 2 according to an exemplary embodiment of the present invention.

FIG. 1 is an external view of an imaging device which is mounted with a lens device 2 according to an exemplary embodiment of the present invention. The lens device 2 is mounted on a front side of a main body of an imaging device 1.

The lens device 2 includes a case 10 having a tubular shape such as a cylindrical shape. In the case 10, an imaging lens such as a zoom lens or a focus lens and a diaphragm device which is capable of adjusting an aperture amount are mounted therein. A mount unit 3 is formed in a base unit of the case 10 of the lens device 2. A connecting unit of the mount unit 3 is detachably mounted to a lens installation unit which is provided on the front side of the main body of the imaging device 1 so that the lens device 2 is fixed to the main body of the imaging device 1.

In the main body of the imaging device 1, an imaging element is disposed on an optical axis of the lens device 2 while the lens device 2 is mounted therein. The imaging element captures an optical image which is focused by the lens device 2. A signal output from the imaging element is processed by an image processing unit which is mounted in the main body of the imaging device 1 to generate various image data.

A photographer 5 carries the main body of the imaging device 1 on a right shoulder, and takes a look inside a finder device 6, for example, with a right eye. The photographer 5 grasps a grasping unit of the lens device 2 with a right hand 7 to capture an image of a subject while fixing the imaging device.

A focus ring 8 which adjusts a focal position of the focus lens is provided at a front edge (a subject side) of the lens device 2 to be turnable around an outer periphery of the lens device 2. The photographer 5 may adjust the focal position by rotating the focus ring 8 by a predetermined angle using hands.

A zoom ring 9 which adjusts a zoom position of the zoom lens is provided in the middle of the lens device 2 to be turnable around the outer periphery of the lens device 2. The photographer 5 may adjust a zoom magnification by rotating the zoom ring 9 by a predetermined angle using hands.

In the lens device 2, an iris ring 11 which adjusts an aperture amount of a diaphragm device is provided at a portion of the zoom ring 9 which is closer to the main body of the imaging device 1. The iris ring 11 is provided to be turnable around the outer periphery of the lens device 2.

Figure 2:
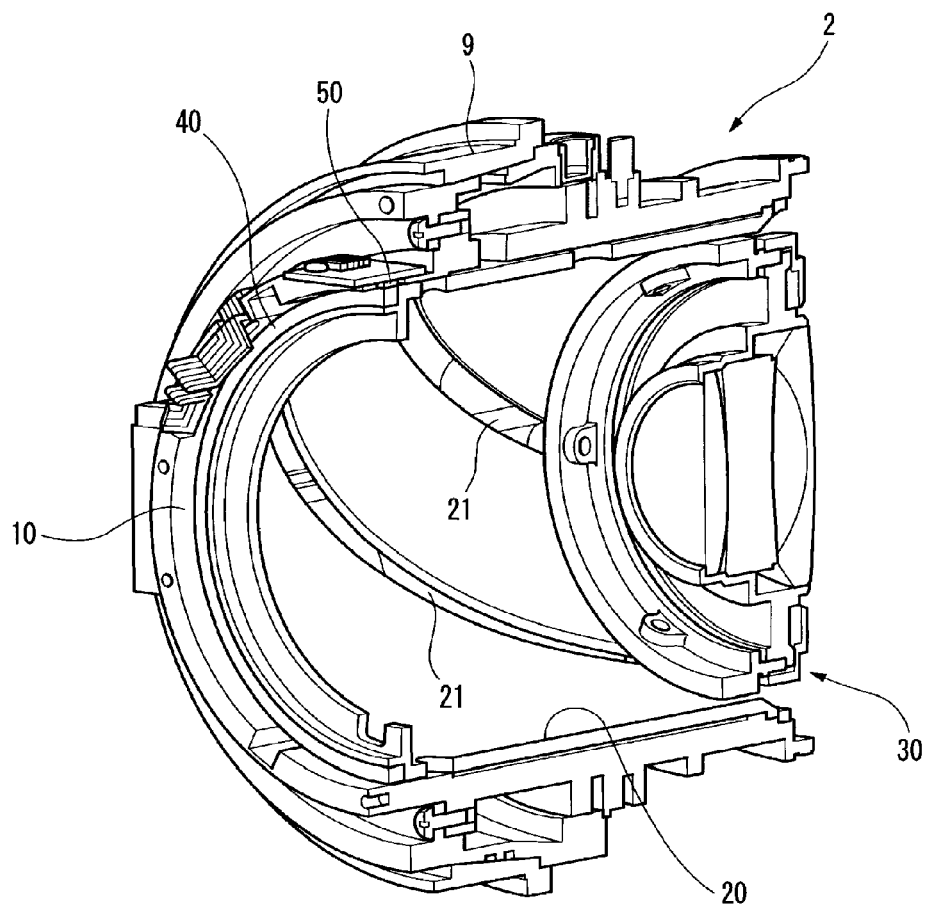
FIG. 2 is a cross-sectional perspective view of the vicinity of a zoom ring 9 of the lens device 2 illustrated in FIG. 1.

FIG. 2 is a cross-sectional perspective view of the vicinity of the zoom ring 9 of the lens device 2 illustrated in FIG. 1.

A rotary tube 20 which rotates around the optical axis of the lens device 2 and the zoom lens holding unit 30 which is provided in the rotary tube 20 to hold the zoom lens as a movable optical element are provided in the case 10 which includes the zoom ring 9 formed at the outer periphery.

The zoom lens holding unit 30 moves in the direction of the optical axis of the lens device 2 in an interlocking manner with the rotation of the zoom ring 9.

The rotary tube 20 has a cam groove 21 which converts a linear motion of the zoom lens holding unit 30 into a rotational motion. A protrusion of the zoom lens holding unit 30 is movably mounted in the cam groove 21 and when the zoom lens holding unit 30 moves in the optical axis direction, the rotary tube 20 rotates around the optical axis in accordance with the movement. In the present exemplary embodiment, it will be described that the rotary tube 20 rotates by 300 degrees by way of an example.

The magnetic recording scale 40 which extends along the circumferential direction of the rotary tube 20 is fixedly disposed on the outer periphery of the rotary tube 20. In the present exemplary embodiment, even though an annular magnetic recording scale 40 is used, a linear magnetic recording scale 40 which has a length corresponding to a rotatable angle of the rotary tube 20 may be used instead of the annular magnetic recording scale 40.

A magnetic sensor unit 50 is fixed into the case 10 to face the magnetic recording scale 40.

Figure 3:
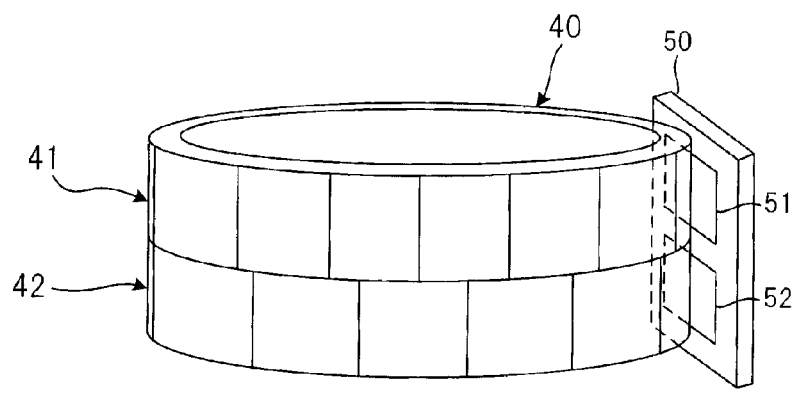
FIG. 3 is a partial enlarged view of a magnetic recording scale 40 and a magnetic sensor unit 50 facing the magnetic recording scale 40 which are illustrated in FIG. 2.
Figure 4:
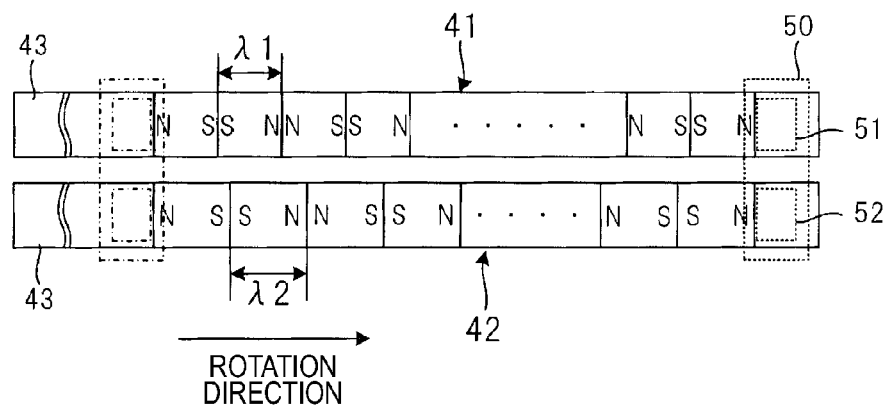
FIG. 4 is a development view of the magnetic recording scale 40 illustrated in FIG. 2.

FIG. 3 is a partial enlarged view of the magnetic recording scale 40 and the magnetic sensor unit 50 facing the magnetic recording scale 40 which are illustrated in FIG. 2. FIG. 4 is a development view of the magnetic recording scale 40 illustrated in FIG. 2.

As illustrated in FIG. 3, the magnetic recording scale 40 is configured by stacking a magnetic recording scale 41 and a magnetic recording scale 42.

The magnetic recording scale 41 is recorded with information of a sine wave with a wavelength $\lambda 1$ as magnetic information. The magnetic recording scale 42 is recorded with information of a sine wave with a wavelength $\lambda 2$ which is longer than the wavelength $\lambda 1$, as magnetic information.

The magnetic sensor unit 50 includes a magnetic sensor 51 which is disposed to face the magnetic recording scale 41 and a magnetic sensor 52 which is disposed to face the magnetic recording scale 42.

The magnetic sensor 51 includes two magnetoresistance effect elements of which the electric resistances change depending on an applied magnetic field and detects a sine wave signal having a wavelength $\lambda 1$ and a cosine wave signal whose phase is shifted by 90 degrees with respect to the sine wave signal based on the magnetic information which is recorded in the magnetic recording scale 41 and outputs these signals.

The magnetic sensor 52 includes two magnetoresistance effect elements of which the electric resistances change depending on an applied magnetic field and detects a sine wave signal having a wavelength $\lambda 2$ and a cosine wave signal whose phase is shifted by 90 degrees with respect to the sine wave signal based on the magnetic information which is recorded in the magnetic recording scale 42 and outputs these signals.

As illustrated in FIG. 4, the magnetic recording scale 41 is magnetized with information on the sine wave with a wavelength $\lambda 1$ within a predetermined range of a support 43. Further, the magnetic recording scale 42 is magnetized with information on the sine wave with a wavelength $\lambda 2$ which is longer than the wavelength $\lambda 1$, within a range of a support 44 corresponding to the predetermined range. In FIG. 4, "N" refers to a north pole of a magnet and "S" refers to a south pole.

In FIG. 4, a position of the magnetic sensor unit 50 with respect to the magnetic recording scale 40 when the rotation angle of the rotary tube 20 is zero degree (for example, the zoom lens has a wide angle end) is denoted by a broken line. When the rotary tube 20 rotates, the position of the magnetic sensor unit 50, which is illustrated by the broken line in FIG. 4, moves to a left side of the drawing. When the rotation angle is 300 degrees, the magnetic sensor unit 50 is disposed in a position denoted by one-dot chain line in FIG. 4.

Figure 5:
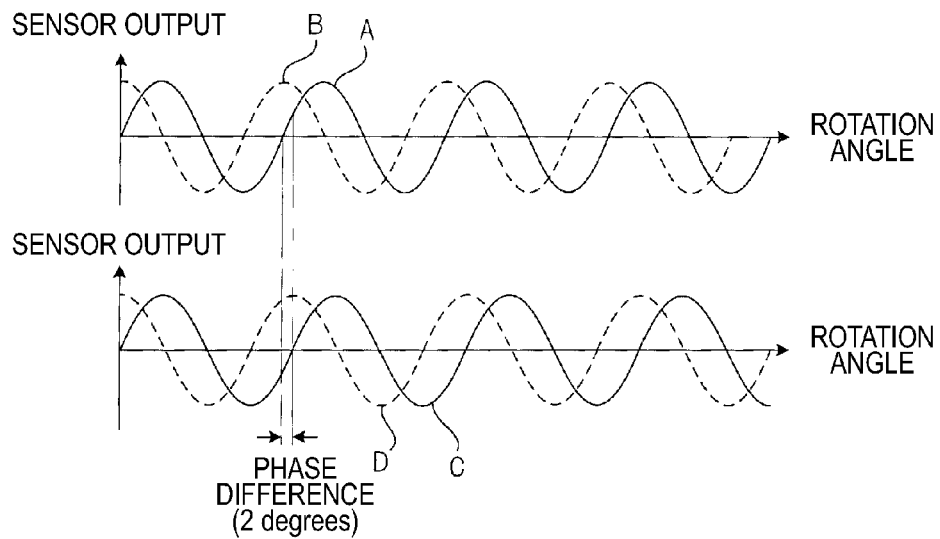
FIG. 5 is a view illustrating a waveform of a signal which is output from the magnetic sensor unit 50 when a rotary tube 20 illustrated in FIG. 2 rotates.

FIG. 5 is a view illustrating a waveform of a signal which is output from the magnetic sensor unit 50 when a rotary tube 20 illustrated in FIG. 2 rotates.

Waveforms denoted by referential symbols A and B (hereinafter, referred to as an A-phase and a B-phase) in FIG. 5 are waveforms of signals output from the magnetic sensor 51 which faces the magnetic recording scale 41. The B-phase is shifted from the A-phase by 90 degrees.

Waveforms denoted by referential symbols C and D (hereinafter, referred to as a C-phase and a D-phase) in FIG. 5 are waveforms of signals output from the magnetic sensor 52 which faces the magnetic recording scale 42. The C-phase is the same as the A-phase at first but the C-phase is faster than the A-phase by 2 degrees at every cycle (1 pulse). Further, the D-phase is a signal which is shifted from the C-phase by 90 degrees.

In the present exemplary embodiment, while the rotary tube 20 rotates by 300 degrees, the magnetic recording scales 41 and 42 are magnetized such that the A-phase and the B-phase are output by 150 pulses and the C-phase and the D-phase are output by 149 pulses.

When a lens aperture of a general lens device for broadcast is considered, diameters of the magnetic recording scales 41 and 42 are practically set to be approximately 80 mm. In order to achieve the above-mentioned numbers of pulses with this diameter, the wavelength $\lambda 1$ which is a magnetized pitch should be set to be approximately 1.4 mm and the wavelength $\lambda 2$ should be set to be approximately 1.41 mm.

Figure 6:
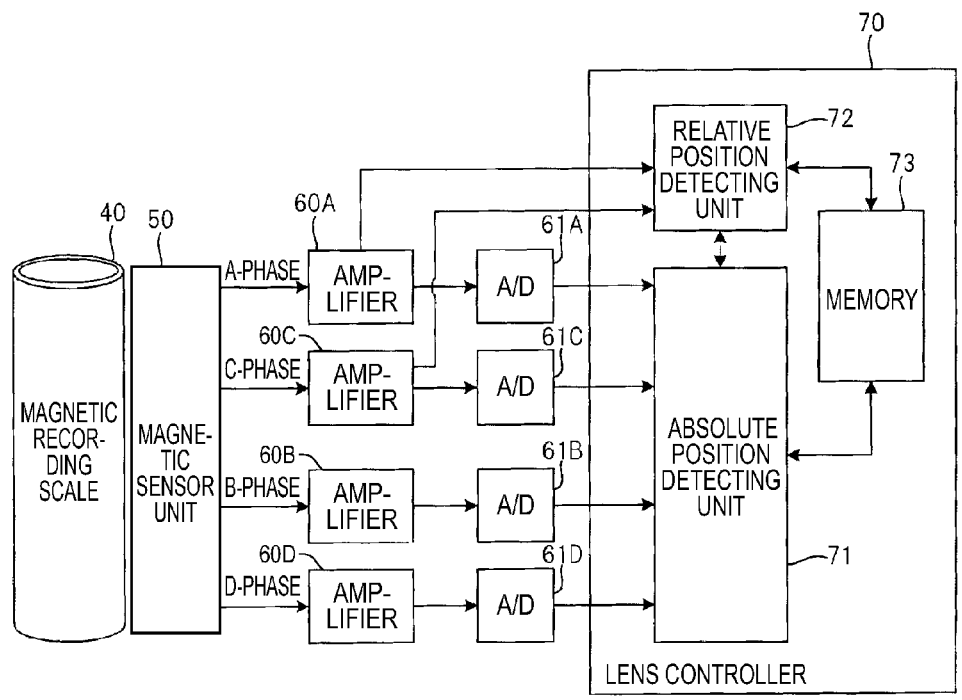
FIG. 6 is a view illustrating functional blocks of the lens device 2 which detects a position of a zoom lens holding unit 30 (that is, a position of a zoom lens) illustrated in FIG. 2.

FIG. 6 is a view illustrating functional blocks of the lens device 2 which detects a position of the zoom lens holding unit 30 (that is, a position of a zoom lens) illustrated in FIG. 2.

The lens device 2 is provided with amplifiers 60A, 60B, 60C, and 60D, A/D converters 61A, 61B, 61C, and 61D, and a lens controller 70.

The amplifier 60A amplifies an A-phase signal output from the magnetic sensor unit 50. The amplifier 60B amplifies a B-phase signal output from the magnetic sensor unit 50. The amplifier 60C amplifies a C-phase signal output from the magnetic sensor unit 50. The amplifier 60D amplifies a D-phase signal output from the magnetic sensor unit 50.

The A/D converter 61A samples the A-phase signal which is amplified by the amplifier 60A at a predetermined interval to convert the A-phase signal into a digital signal. The A/D converter 61B samples the B-phase signal which is amplified by the amplifier 60B at a predetermined interval to convert the B-phase signal into a digital signal. The A/D converter 61C samples the C-phase signal which is amplified by the amplifier 60C at a predetermined interval to convert the C-phase signal into a digital signal. The A/D converter 61D samples the D-phase signal which is amplified by the amplifier 60D at a predetermined interval to convert the D-phase signal into a digital signal.

The lens controller 70 includes an absolute position detecting unit 71 which detects an absolute position of the zoom lens, a relative position detecting unit 72 which detects a position (a relative position) of the zoom lens with respect to the absolute position which is detected by the absolute position detecting unit 71, and a memory 73.

The lens controller 70 is configured to have a processor as a main subject and the absolute position detecting unit 71 and the relative position detecting unit 72 are functional blocks which are implemented when the processor executes a program stored in the memory 73.

The absolute position detecting unit 71 calculates a phase difference θ of the A-phase and the C-phase based on the signals of the A-phase, the B-phase, the C-phase, and the D-phase at an arbitrary timing which are output from the A/D converters 61A to 61D. For example, the absolute position detecting unit 71 operates arctan(A/B)−arctan(C/D) (A, B, C, and D are signal levels which are obtained at an arbitrary timing of the phases) to calculate the phase difference θ.

Because the relationship between the phase difference θ and the position (corresponding to the number of pulses) of the zoom lens is already known, when the phase difference θ may be calculated, the absolute position of the zoom lens corresponding to the phase difference may be detected.

However, in practice, when a magnetic recording scale has a large diameter and a hollow shape like the magnetic recording scales 41 and 42, a magnetized unevenness is generated in the creating the magnetic recording scale. Further, when the magnetic recording scales 41 and 42 are inserted into the lens device 2, it is difficult to insert the magnetic recording scales as designed and a distance between the magnetic recording scale 40 and the magnetic sensor unit 50 is not constant over the entire rotational angle due to an insertion error or a manufacturing error of other members. This phenomenon is specifically significant in the lens device 2 which does not have an enough space where the magnetic recording scale 40 is disposed.

Figure 7:
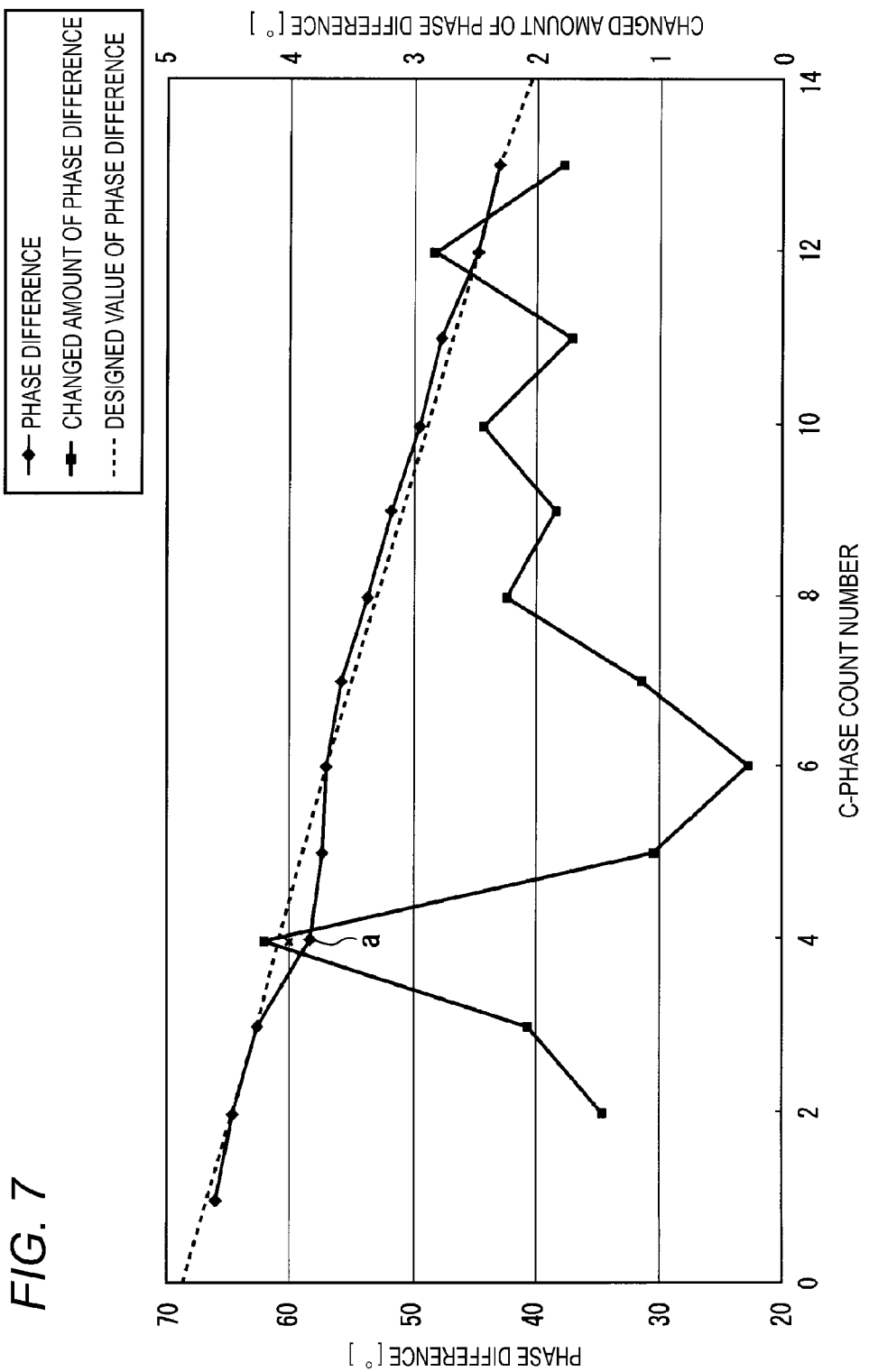
FIG. 7 is a graph illustrating a result of reviewing an output change of the magnetic sensor unit 50 when the magnetic recording scale 40 and the magnetic sensor unit 50 are inserted in an actual apparatus.

FIG. 7 is a graph illustrating a result of reviewing an output change of the magnetic sensor unit 50 when the magnetic recording scale 40 and the magnetic sensor unit 50 are inserted into an actual apparatus.

In the meantime, FIG. 7 illustrates a review result when the magnetic recording scale 40 is designed and created such that the A-phase and the B-phase, and the C-phase and the D-phase, of which the phase differences θ are shifted by 2 degrees as illustrated in FIG. 5, are output from the magnetic sensor unit 50 and the numbers of output pulses of the A-phase and the B-phase per rotation of the rotary tube 20 are different from the above-mentioned values. Further, FIG. 7 illustrates a review result when the rotary tube 20 rotates from a terminating edge to a beginning edge.

A horizontal axis in FIG. 7 represents a cumulative number of pulses of the output C-phase. Further, a left vertical axis of FIG. 7 represents the phase difference θ which is obtained by the above-mentioned arithmetic operation. Further, a right vertical axis of FIG. 7 represents a changed amount of the pulse before the phase difference θ.

A broken line illustrated in FIG. 7 represents a change in the phase difference θ when it is assumed that the magnetic recording scale 40 is manufactured as designed and the insertion error into the lens device is not generated.

As can be seen from FIG. 7, for an actual apparatus, the phase difference θ is changed from an ideal value (design value) of the broken line. For example, when the phase difference θ obtained by the arithmetic operation by the absolute position detecting unit 71 is a value represented by a reference symbol a in FIG. 7, a designed number of pulses corresponding to the phase difference at the point a is "approximately 5.5". However, in practice, the point "a" is a phase difference obtained only when the number of pulses is "4". Thus, when the phase difference θ is simply obtained by the above-mentioned method, the absolute position is erroneously detected.

Therefore, in the present exemplary embodiment, the absolute position detecting unit 71 calculates the phase difference θ for each of n pulses (n is a natural number of 2 or larger) by the above-described arithmetic operation, calculates an average of a plurality of calculated phase differences θ, and detects an absolute position of the zoom lens based on the average.

In FIG. 7, when an average of five phase differences at the point a and respective two points before and after the point a is calculated and the average is replaced by the phase difference of the point a, the phase difference of the point a is a point represented by a mark x in FIG. 7, which approximates to the designed value. Therefore, when the average is used, the precision of detecting the absolute position may be improved.

Referring to the description of FIG. 6 again, the relative position detecting unit 72 is a so-called incremental encoder and compares the A-phase signal output from the amplifier 60A and the B-phase signal output from the amplifier 60B to determine a movement direction of the zoom lens holding unit 30 and counts the numbers of pulses of the A-phase signal and the B-phase signal to detect the relative position of the zoom lens holding unit 30 from the absolute position detected by the absolute position detecting unit 71.

Meanwhile, the relative position detecting unit 72 may compare the C-phase signal and the D-phase signal to determine a movement direction of the zoom lens holding unit 30 and count the numbers of pulses of the C-phase signal and the D-phase signal to detect the relative position of the zoom lens holding unit 30 from the absolute position detected by the absolute position detecting unit 71.

Next, a position detecting operation of a zoom lens by the lens device 2 configured as described above will be described with reference to FIGS. 8 and 9.

Figure 8:
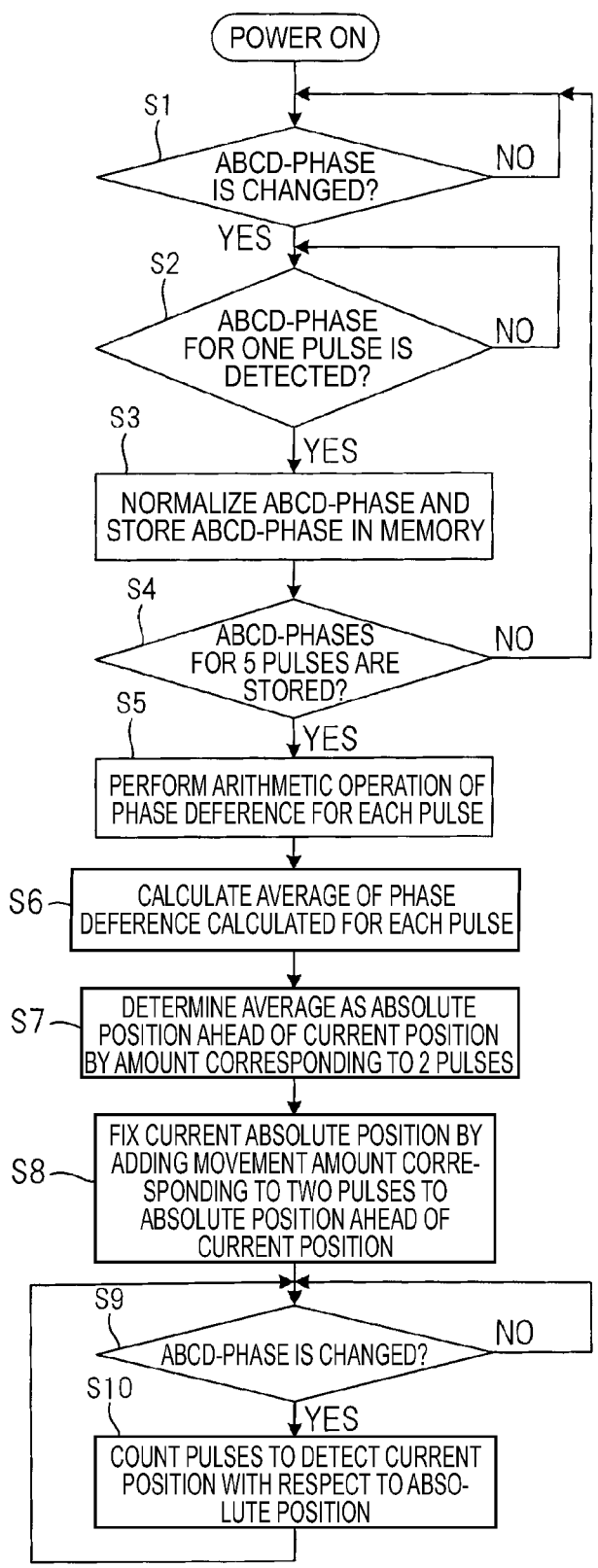
FIG. 8 is a flowchart illustrating a position detecting operation of a zoom lens by the lens device 2 illustrated in FIG. 1.

FIG. 8 is a flowchart illustrating a position detecting operation of a zoom lens by the lens device 2 illustrated in FIG. 1. FIG. 9 illustrates A, B, C, and D-phase waveforms output from the magnetic sensor unit 50 when the zoom ring 9 of the lens device 2 illustrated in FIG. 1 rotates in one direction.

When a power of the lens device 2 is turned ON by a user, an A-phase signal, a B-phase signal, a C-phase signal, and a D-phase signal (hereinafter, collectively referred to as an ABCD-phase) corresponding to a current position of the zoom lens are output from A/D converters 61A to 61D. For example, it is assumed that the power is turned ON at a timing represented at a time T1 of FIG. 9.

After the power is turned ON, an absolute position detecting unit 71 determines whether output signals of the A/D converters 61A to 61D are changed in step S1.

After the power is turned ON, when the user rotates a zoom ring 9 in one direction and the signals output from the A/D converters 61A to 61D are changed (Yes in step S1), the absolute position detecting unit 71 determines whether to detect an ABCD-phase for one cycle (one pulse) in step S2 and repeats a processing of step S2 until the ABCD-phase is detected.

When the absolute position detecting unit 71 detects the ABCD-phase for one cycle (one pulse) in step S2, the absolute position detecting unit 71 normalizes the ABCD-phase to be stored in a memory 73 in step S3.

Next, when the ABCD-phases for n pulses (here, n=5) are not stored in the memory 73 (No in step S4), the absolute position detecting unit 71 returns the processing to step S1 and when the ABCD-phases are stored in the memory 73, the absolute position detecting unit 71 performs the processing of step S5.

In the meantime, during steps S1 to S4, a relative position detecting unit 72 compares the A-phase signal and the B-phase signal to detect the movement direction of the zoom lens since the power is turned ON and inputs the detecting result to the absolute position detecting unit 71.

In step S5, the absolute position detecting unit 71 performs an arithmetic operation of arctan(A/B)−arctan(C/D) for every ABCD-phase for five pulses stored in the memory 73 using the ABCD-phase obtained at a predetermined timing (for example, a timing when an amplitude of the A-phase is zero) and calculates the phase difference θ for each of the five pulses.

For example, as illustrated in FIG. 9, the absolute position detecting unit 71 calculates a phase difference θ(1) for a first pulse output since the power is turned ON using the ABCD-phase obtained at a time T2, a phase difference θ(2) for a second pulse using the ABCD-phase obtained at a time T3, a phase difference θ(3) for a third pulse using the ABCD-phase obtained at a time T4, a phase difference θ(4) for a fourth pulse using the ABCD-phase obtained at a time T5, and a phase difference θ(5) for a fifth pulse using the ABCD-phase obtained at a time T6.

Next, the absolute position detecting unit 71 calculates the average of the phase differences θ(1) to θ(5) in step S6 and considers the average as a phase difference at the third pulse. Further, an absolute position (absolute position ahead of the current position by an amount corresponding to two pulses) of the zoom lens corresponding to the phase difference of the third pulse is determined based on the phase difference at the third pulse and data which associates the phase difference (designed value) stored in the memory 73 with the position of the zoom lens in step S7.

Next, the absolute position detecting unit 71 adds or subtracts a movement amount corresponding to two pulses to or from the absolute position determined in step S7 in accordance with the movement direction of the zoom lens from the time when the power is turned ON to the current time, which is received from the relative position detecting unit 72 to fix the absolute position of the zoom lens in step S8.

For example, when the movement direction of the zoom lens is a direction where the phase difference θ is changed from a small value to a large value, the absolute position detecting unit 71 adds a movement amount corresponding to two pulses to the absolute position determined in step S7 to fix the absolute position.

Meanwhile, when the movement direction of the zoom lens is a direction where the phase difference θ is changed from a large value to a small value, the absolute position detecting unit 71 subtracts a movement amount corresponding to two pulses from the absolute position determined in step S7 to fix the absolute position.

The absolute position detecting unit 71 may output the fixed absolute position on a display unit which is connected to the main body of the imaging device 1 to notify the absolute position to the user.

After step S8, when the A-phase signal and the B-phase signal are changed (Yes in step S9), the relative position detecting unit 72 compares the A-phase signal with the B-phase signal to determine the movement direction of the zoom lens and counts the numbers of pulses of the A-phase signal and the B-phase signal (for example, numbers of pulses at 64 multiplied precision) to detect the relative position of the zoom lens having the absolute position fixed in step S8 as a reference position in step S10.

As described above, according to the lens device 2 of the present exemplary embodiment, the current position of the zoom lens is determined based on the average of the phase differences which are obtained for n pulses output from the magnetic sensor unit 50 after turning ON the power so that influence due to the magnetized unevenness of the magnetic recording scale 40 or the insertion error of the lens device 2 is reduced, which may improve the precision of detecting the current position.

According to the lens device 2, the absolute position may be detected using an operation which is simpler than the absolute position detection method disclosed in Patent Literature 2, so that the manufacturing cost and power consumption may be reduced.

According to the lens device 2, only one magnetic sensor is provided for each of the magnetic recording scales 41 and 42 so that the manufacturing cost and the size may be reduced as compared with the absolute position detection method disclosed in Patent Literature 3.

In the actual apparatus, the calculated phase difference (actual measurement value) may be approximately same even for different pulses due to the above-mentioned magnetized unevenness, insertion error, and a noise of the magnetic sensor unit 50 in some cases.

In this case, according to the related art, it is difficult to determine a pulse which corresponds to the phase difference (actual measurement value). Meanwhile, a possibility of obtaining the same average of five phase differences (actual measurement values) even for different pulses is very low so that the precision of detecting the absolute position may be improved.

According to the lens device 2, a unit which detects the absolute position of the zoom lens is provided in the lens barrel so that when the unit is compared with the lens device which is attached to outside of the lens barrel, there is no need to consider the mechanical backlash. Therefore, even when the zoom ring reversely rotates, a position deviation due to mechanical fluctuation is not generated so that the position may be detected with high precision.

In the meantime, even though it has been described that n=5 in the above-description of the operation, for example, when n=7, an average of the phase differences θ obtained for seven pulses is treated as a phase difference corresponding to a fourth pulse to obtain an absolute position of the zoom lens at the fourth pulse based on the phase difference and then fix a position which is obtained by displacing the absolute position by a position for three pulses as an absolute position.

For example, when n=4, an average of the phase differences θ obtained for four pulses is treated as a phase difference corresponding to a second pulse or a third pulse to obtain an absolute position of the zoom lens at the second pulse or the third pulse based on the phase difference and then fix a position which is obtained by displacing the absolute position by a position corresponding to two pulses or one pulse as an absolute position.

That is, when n is an odd number, the absolute position detecting unit 71 displaces the absolute position corresponding to the average of the phase differences θ calculated for n pulses by a pulse corresponding to a "quotient obtained by dividing n by 2" to fix a final absolute position.

When n is an even number, the absolute position detecting unit 71 displaces the absolute position corresponding to the average of the phase differences θ calculated for n pulses by a pulse corresponding to a "quotient obtained by dividing n by 2" or a "(quotient obtained by dividing n by 2)−1" to fix a final absolute position.

When the precision of the absolute position is considered, n may be three or larger. Further, n may be the same as the number of pulses (about 5 to 10) which are output from the magnetic sensor unit 50 in accordance with an angle (about 10 degrees to 20 degrees when the rotary tube 20 is b80 mm) by which the rotary tube 20 rotates by one rotation.

Accordingly, the user may figure out the absolute position of the zoom lens only by lightly rotating the zoom ring 9 once in a predetermined direction after turning ON the power of the lens device 2 so that the operation until the absolute position is figured out becomes simple.

In the above description of the operation, even though the ABCD-phase which is used to calculate the phase difference in step S5 is the data obtained at a timing when the amplitude of the A-phase signal is zero, the present invention is not limited thereto and data obtained at a predetermined timing may be used.

The phase difference θ which is obtained from the data of the ABCD-phase which is obtained at the timing when an amplitude of any one of the ABCD-phase is zero is closer to the designed phase difference (has a small error) than the phase difference θ which is obtained from the data of the ABCD-phase which is obtained at the timing when an amplitude of any one of the ABCD-phase is not zero.

Therefore, in step S5 of FIG. 8, the phase difference θ for every pulse is calculated based on the data of the ABCD-phase which is obtained at the timing when an amplitude of any one of the ABCD-phase is zero so that the precision of the absolute position of the zoom lens which is finally obtained may be improved.

In the example of FIG. 7, all the phase differences (actual measurement values) corresponding to the count number 7, 8, 9, 10, and 11 of the C-phase are larger than the designed value.

When the average of five phase differences (actual measurement values) is calculated and the average is treated as a phase difference corresponding to the count number 9 of the C-phase to detect the absolute position, an effect of increasing the precision of detecting the absolute position may weaken. That is, in accordance with the position of the zoom lens when the power is turned ON, the absolute position determined in step S7 of FIG. 8 may have an error.

Therefore, in the lens device 2, an error correction table to correct the error is stored in the memory 73 and the error may be corrected based on the average of the phase differences calculated by the absolute position detecting unit 71 in step S6 and the error correction table. Hereinafter, a configuration example which may desirably correct the error will be described.

When the lens device 2 is shipped, the zoom lens moves from a telephoto end to a wide angle end and then the phase differences θ for 149 pulses output from the magnetic sensor unit 50 are calculated. Next, a movement average for every five (=n) phase differences of 149 phase differences θ is calculated.

Specifically, an average of phase differences corresponding to first to fifth pulses, an average of phase differences corresponding to second to sixth pulses, an average of phase differences corresponding to third to seventh pulses, . . . , and an average of phase differences corresponding to 145th to 149th pulses are calculated.

The designed values of the phase differences θ corresponding to 149 pulses are already known, so that a difference between the movement average and the movement average of the designed values is obtained as error data.

Specifically, (an average of phase differences (designed values) corresponding to first to fifth pulses)−(an average of phase differences (actual measurement values) corresponding to first to fifth pulses), (an average of phase differences (designed values) corresponding to second to sixth pulses)−(an average of phase differences (actual measurement values) corresponding to second to sixth pulses), . . . , (an average of phase differences (designed values) corresponding to 145th to 149th pulses)−(an average of phase differences (actual measurement values) corresponding to 145th to 149th pulses) are calculated.

An error correction table in which the error data is associated with the average (actual measurement value) of the phase differences corresponding to the error data is created and the table is stored in the memory 73.

When the power of the lens device 2 is turned ON, if the average (actual measurement value) of the phase differences is calculated in step S6 of FIG. 8, the absolute position detecting unit 71 compares the average (actual measurement value) with the error correction table to read out the error data corresponding to the average (actual measurement value) from the memory 73.

The absolute position detecting unit 71 corrects the average (actual measurement value) obtained in step S6 using the read error data. Next, the absolute position detecting unit 71 determines the absolute position of the zoom lens corresponding to the corrected average as an absolute position corresponding to the third pulse. With this configuration, the precision of detecting an absolute position of the zoom lens may be further improved.

It is understood that the error data obtained by moving the zoom lens from one end to the other end within a movable range is different from the error data obtained by moving the zoom lens from the other end to the one end within a movable range.

Therefore, the error correction table corresponding to a case obtained by moving the zoom lens from one end to the other end within the movable range and the error correction table corresponding to a case obtained by moving the zoom lens from the other end to the one end within the movable range are desirably prepared.

In this case, the absolute position detecting unit 71 corrects the error using the error correction table corresponding to the movement direction of the zoom lens which is notified by the relative position detecting unit 72.

Till now, even though it has been described that the zoom lens is an example of the movable optical element which is mounted in the lens device 2, the technology described in the exemplary embodiment may be applied to other movable optical element such as a focus lens or a diaphragm device.

As described above, the specification discloses as follows.

The specification discloses a lens device having a movable optical element, the lens device comprising: a rotary member which rotates in accordance with a movement of the movable optical element; a first magnetic recording scale and a second magnetic recording scale which are recorded with magnetic signals having different wavelengths, respectively, the first magnetic recording scale and the second magnetic recording scale being fixedly disposed on an outer periphery of the rotary member to extend along a peripheral direction of the rotary member; a signal detecting unit which detects a first signal corresponding to a magnetic signal having a first wavelength recorded in the first magnetic recording scale and a second signal, of which a phase is shifted from that of the first signal by a predetermined amount from the first magnetic recording scale, and detects a third signal which corresponds to a magnetic signal having a second wavelength which is different from the first wavelength and is recorded in the second magnetic recording scale and a fourth signal, of which a phase is shifted from that of the third signal by the predetermined amount from the second magnetic recording scale; and a position detecting unit which detects a position of the movable optical element based on the signals which are detected by the signal detecting unit, wherein the position detecting unit includes: a phase difference calculating unit which calculates a phase difference between the first signal and the third signal, based on the first signal, the second signal, the third signal, and the fourth signal for one cycle which are detected by the signal detecting unit; a phase average calculating unit which calculates an average of the phase differences respectively calculated for n (n is a natural number of 2 or larger) cycles by the phase difference calculating unit; and an absolute position detecting unit which detects an absolute position of the movable optical element based on the average which is calculated by the phase average calculating unit.

The specification discloses the lens device, further comprising: an error data storing unit which stores, as error data, a difference between a movement average for every n phase differences which is obtained by moving the movable optical element from end to end within a movable range and a designed value of the movement average for every n phase differences, wherein the absolute position detecting unit compares the average obtained by the phase average calculating unit and the error data to correct the average based on the error data and detects the absolute position based on the corrected average.

The specification discloses the lens device, wherein the error data storing unit stores, as the error data, first error data obtained by moving the movable optical element from one end to the other end within the movable range, and second error data obtained by moving the movable optical element from the other end to the one end within the movable range.

The specification discloses the lens device, wherein the position detecting unit includes a movement direction determining unit which determines a movement direction of the movable optical element when the signals for n cycles are obtained based on the signal detected by the signal detecting unit, and the absolute position detecting unit selects any of the first error data and the second error data along the movement direction which is determined by the movement direction determining unit in the correction.

The specification discloses the lens device, wherein the phase calculating unit uses the first signal, the second signal, the third signal, and the fourth signal used to calculate phase difference at a time when an amplitude of any one of the first signal, the second signal, the third signal, and the fourth signal is zero.

The specification discloses the lens device, wherein the position detecting unit includes a relative position detecting unit which counts a signal which is detected by the signal detecting unit after detecting the absolute position to detect a position of the movable optical element with respect to the absolute position.

The specification discloses a position detection method of a movable optical element which is mounted in a lens device, the method comprising: a signal detecting step of detecting a first signal corresponding to a magnetic signal having a first wavelength which is recorded in a first magnetic recording scale and a second signal of which a phase is shifted from that of the first signal by a predetermined amount and a third signal corresponding to a magnetic signal having a second wavelength, which is different from the first wavelength, which is recorded in a second magnetic recording scale and a fourth signal of which a phase is shifted from that of the third signal by the predetermined amount, from the first magnetic recording scale and the second magnetic recording scale which are fixedly disposed on an outer periphery of a rotary member which rotates in accordance with a movement of the movable optical element and extend along the peripheral direction of the rotary member; a phase difference calculating step of calculating a phase difference between the first signal and the third signal, based on the first signal, the second signal, the third signal, and the fourth signal for one cycle which are detected by the signal detecting step; a phase average calculating step of calculating an average of the phase differences respectively calculated for n (n is a natural number of 2 or larger) cycles by the phase calculating step; and an absolute position detecting step of detecting an absolute position of the movable optical element based on the average which is calculated by the phase average calculating step.

The present invention is effectively applied to the lens device for a television camera.

It is obvious to those skilled in the art that the present invention is not limited to the above-described exemplary embodiment but various changes or modifications may be made without departing from the technical spirit of the disclosed present invention.

The present application is based on Japanese Patent Application (Patent Application No. 2012-16971) filed on Jan. 30, 2012, the content of which is incorporated herein by reference.

What is claimed is:

1. A lens device having a movable optical element, the lens device comprising:
a rotary member which rotates in accordance with a movement of the movable optical element;
a first magnetic recording scale and a second magnetic recording scale which are recorded with magnetic signals having different wavelengths, respectively, the first magnetic recording scale and the second magnetic recording scale being fixedly disposed on an outer periphery of the rotary member to extend along a peripheral direction of the rotary member;
a signal detecting unit which detects a first signal corresponding to a magnetic signal having a first wavelength recorded in the first magnetic recording scale and a second signal, of which a phase is shifted from that of the first signal by a predetermined amount from the first magnetic recording scale, and detects a third signal which corresponds to a magnetic signal having a second wavelength which is different from the first wavelength and is recorded in the second magnetic recording scale and a fourth signal, of which a phase is shifted from that of the third signal by the predetermined amount from the second magnetic recording scale; and
a position detecting unit which detects a position of the movable optical element based on the signals which are detected by the signal detecting unit,
wherein the position detecting unit includes:
a phase difference calculating unit which calculates a phase difference between the first signal and the third signal, based on the first signal, the second signal, the third signal, and the fourth signal for one cycle which are detected by the signal detecting unit;
a phase average calculating unit which calculates an average of the phase differences respectively calculated for n (n is a natural number of 2 or larger) cycles by the phase difference calculating unit; and
an absolute position detecting unit which detects an absolute position of the movable optical element based on the average which is calculated by the phase average calculating unit,
wherein the lens device further comprises:
an error data storing unit which stores, as error data, a difference between a movement average for every n phase differences which is obtained by moving the movable optical element from end to end within a movable range and a designed value of the movement average for every n phase differences, and wherein the absolute position detecting unit compares the average obtained by the phase average calculating unit and the error data to correct the average based on the error data and detects the absolute position based on the corrected average.

2. The lens device of claim 1, wherein the error data storing unit stores, as the error data, first error data obtained by moving the movable optical element from one end to the other end within the movable range, and second error data obtained by moving the movable optical element from the other end to the one end within the movable range.

3. The lens device of claim 2, wherein the position detecting unit includes a movement direction determining unit which determines a movement direction of the movable optical element when the signals for n cycles are obtained based on the signal detected by the signal detecting unit, and the absolute position detecting unit selects any of the first error data and the second error data along the movement direction which is determined by the movement direction determining unit in the correction.

4. The lens device of claim 1, wherein the phase calculating unit uses the first signal, the second signal, the third signal, and the fourth signal used to calculate phase difference at a time when an amplitude of any one of the first signal, the second signal, the third signal, and the fourth signal is zero.

5. The lens device of claim 1, wherein the position detecting unit includes a relative position detecting unit which counts a signal which is detected by the signal detecting unit after detecting the absolute position to detect a position of the movable optical element with respect to the absolute position.

6. A position detection method of a movable optical element which is mounted in a lens device, the method comprising:

a signal detecting step of detecting a first signal corresponding to a magnetic signal having a first wavelength which is recorded in a first magnetic recording scale and a second signal of which a phase is shifted from that of the first signal by a predetermined amount and a third signal corresponding to a magnetic signal having a second wavelength, which is different from the first wavelength, which is recorded in a second magnetic recording scale and a fourth signal of which a phase is shifted from that of the third signal by the predetermined amount, from the first magnetic recording scale and the second magnetic recording scale which are fixedly disposed on an outer periphery of a rotary member which rotates in accordance with a movement of the movable optical element and extend along the peripheral direction of the rotary member;

a phase difference calculating step of calculating a phase difference between the first signal and the third signal, based on the first signal, the second signal, the third signal, and the fourth signal for one cycle which are detected by the signal detecting step;

a phase average calculating step of calculating an average of the phase differences respectively calculated for n (n is a natural number of 2 or larger) cycles by the phase calculating step;

an absolute position detecting step of detecting an absolute position of the movable optical element based on the average which is calculated by the phase average calculating step; and an error data storing step of storing, as error data, a difference between a movement average for every n phase differences which is obtained by moving the movable optical element from end to end within a movable range and a designed value of the movement average for every n phase differences, wherein the absolute position detecting step compares the average obtained by the phase average calculating step and the error data to correct the average based on the error data and detects the absolute position based on the corrected average.

\* \* \* \* \*